(12) United States Patent
Magyar et al.

(10) Patent No.: US 9,619,993 B2
(45) Date of Patent: Apr. 11, 2017

(54) LOGGING INTO A SYSTEM WITH A BLUETOOTH DEVICE

(71) Applicant: Honeywell International Inc., Morristown, NJ (US)

(72) Inventors: George John Magyar, Wallingford, CT (US); Todd C. Rief, Easton, CT (US); Michael J. Lynch, Madison, CT (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/809,467

(22) Filed: Jul. 27, 2015

(65) Prior Publication Data

US 2017/0032658 A1 Feb. 2, 2017

(51) Int. Cl.
*G08B 1/08* (2006.01)
*G08B 25/00* (2006.01)
*G08B 25/14* (2006.01)
*H04W 4/00* (2009.01)
*H04W 76/02* (2009.01)
*G08B 25/10* (2006.01)

(52) U.S. Cl.
CPC .......... *G08B 25/008* (2013.01); *G08B 25/14* (2013.01); *H04W 4/008* (2013.01); *H04W 76/02* (2013.01); *G08B 25/10* (2013.01)

(58) Field of Classification Search
None
See application file for complete search history.

(56) References Cited

U.S. PATENT DOCUMENTS

| 2007/0241866 A1 | 10/2007 | Cool et al. |
| 2008/0031206 A1 | 2/2008 | Sharma |
| 2013/0139448 A1 | 6/2013 | Edwards |

(Continued)

FOREIGN PATENT DOCUMENTS

EP  0 222 194 A1  5/1987

OTHER PUBLICATIONS extended European search report for corresponding EP patent application 16180244.2, dated Nov. 25, 2016.

(Continued)

*Primary Examiner* — George Bugg
*Assistant Examiner* — Renee Dorsey
(74) *Attorney, Agent, or Firm* — Husch Blackwell LLP

(57) ABSTRACT

A system is provided that includes a control panel of a security system that protects a secured geographic area, wherein a controller enters a set-up mode in response to detecting entry of a code by an authorized user through a user interface and opening of an access door and wirelessly pairs a portable device carried by the authorized user with the control panel and registers the portable device with the controller while in the set-up mode, wherein, when operating in a normal operating mode, the controller detects the portable device and automatically forms a wireless control connection between the portable device and the control panel, and wherein the controller enters a log-on mode during set-up in response to connecting to the portable device and allows the authorized user to unlock the access door and enter a password at the controller, thereby enabling service and control from the portable device.

20 Claims, 1 Drawing Sheet

(56) References Cited

U.S. PATENT DOCUMENTS

| | | | | |
|---|---|---|---|---|
| 2013/0265425 A1* | 10/2013 | Smailus | ................. | G01C 23/00 348/148 |
| 2014/0225713 A1* | 8/2014 | McIntyre | ........... | G07C 9/00309 340/5.61 |
| 2014/0282048 A1 | 9/2014 | Shapiro et al. | | |
| 2015/0228137 A1* | 8/2015 | Chen | ................. | G07C 9/00039 340/5.54 |
| 2015/0351145 A1* | 12/2015 | Burks | .................... | G08C 17/02 455/41.3 |
| 2015/0363745 A1* | 12/2015 | Hatch | ................ | G06Q 10/1091 705/32 |
| 2016/0155319 A1* | 6/2016 | Eskildsen | ............. | G08B 25/14 340/539.19 |

OTHER PUBLICATIONS

English-language translation of abstract for EP 0 222 194 A1, published May 20, 1987.

\* cited by examiner

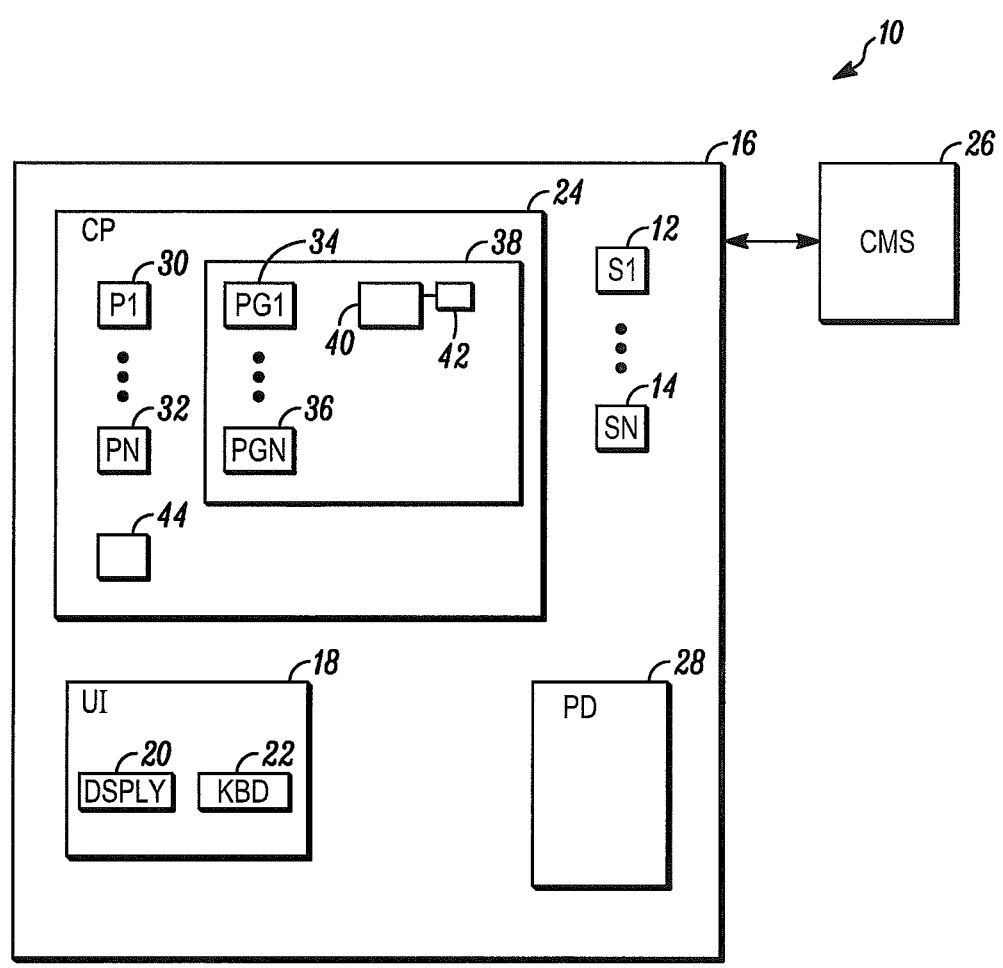

LOGGING INTO A SYSTEM WITH A BLUETOOTH DEVICE

FIELD

This application relates to security systems and, more particularly, to the control of such systems.

BACKGROUND

Systems are known to protect people and assets within secured areas. Such systems are typically based upon the use of one or more sensors that detect threats within the areas.

Threats to people and assets may originate from any of a number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within the area. Intruders have also been known to injure or kill people living within the area.

In the case of intruders, sensors may be placed in different areas based upon the respective uses of those areas. For example, if people are present during some portions of a normal day and not at other times, then sensors may be placed along a periphery of the space to provide protection while the space is occupied while additional sensors may be placed within an interior of the space and used when the space is not occupied.

In most cases, threat detectors are connected to a local control panel. In the event of a threat detected via one of the sensors, the control panel may sound a local audible alarm. The control panel may also send a signal to a central monitoring station.

While conventional security systems work well, it is sometimes difficult or inconvenient to easily access a control panel to enter instructions or analyze faults. Accordingly, a need exists for better methods and apparatuses for remotely accessing the control panel of the security system.

BRIEF DESCRIPTION OF THE DRAWINGS

FIG. 1 illustrates a block diagram of a security system in accordance herewith.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

FIG. 1 is a block diagram of a security system 10 shown generally in accordance with an illustrated embodiment. Included within the system may be one or more sensors 12, 14 that detect threats within a secured geographic area 16. The sensors may be embodied in any of a number of different forms. For example, at least some of the sensors may be switches placed on the doors and/or windows allowing entrance into and egress from the secured area. Other of the sensors may be passive infrared (PIR) sensors placed within an interior of the space to detect intruders who have been able to circumvent the sensors placed along a periphery of the area.

Other of the sensors may be environmental detectors intended to detect environmental threats within the secured area. An environmental threat, in this case, may be presented in the form of a fire or by toxic gases from the fire. In this case, the sensors may include fire, smoke, or carbon monoxide detectors.

The security system may be controlled via a user interface 18. In this case, an authorized human user may enter a personal identification number (PIN) and a function key through a keyboard 22 or simply a function key to arm the security system. Similarly, the user may enter his/her PIN and a disarm function key to disarm the system. In response to the entry of commands, the status of the system, including any activated sensors, may be shown on a display 20. In some embodiments, the keyboard and display are combined into a touch screen display.

In the armed state, the sensors may be monitored by a control panel. The control panel may be located within the secured area (as shown in FIG. 1) or located elsewhere.

Upon activation of one of the sensors, the control panel may send an alarm message to a central monitoring station 26. The central monitoring station may respond by confirming the alarm and/or by summoning help (e.g., police, fire department, etc.).

The system may also include one or more portable wireless devices 28. The portable device may include one or more features that may be used as described below to control the system. The portable device may be embodied under any of a number of different formats (e.g., smartphone, laptop, etc.).

Included within the control panel, the user interface, and the portable device may be a number of processor apparatuses (processors) 30, 32 each operating under control of one or more computer programs 34, 36 loaded from a non-transitory computer readable medium (memory) 38. As used herein, reference to a step performed by a computer program is also reference to the processor that executed that step.

For example, a status processor may control a status of the security system. Upon receiving an arm stay or alarm away command from the user interface or portable device, the status processor may assume an armed state or status. Upon receiving a disarm command, the status processor assumes a disarm state.

In the armed state, an alarm processor monitors the state of each of the sensors. Upon activation of one of the sensors, the alarm processor detects the activation of the sensor and composes an alarm message that is, in turn, sent to the central monitoring station.

Operating in the background may be a display processor that tracks the operation of the status and alarm processors and displays information on the display of the user interface. The display processor may do this by periodically querying the processors for status information or by monitoring for information processed by each of those processors.

Information displayed on the user interface may be displayed continuously or only upon the occurrence of a related event. One of the items of information monitored for by the display processor and displayed on the user interface is the status of the alarm system. Alternatively, when an alarm message is sent to the central monitoring station, the alarm message may be displayed along with the associated information, such as the sensor activated, the time, and a location of the activated sensor.

Also operating in the background may be a tampering processor. The tampering processor may monitor for and detect attempts to disable or impair the security system. For example, the control panel may have an access door 40 secured by tamper-proof screws or a lock and key 42, wherein the access door is used for troubleshooting and/or repair of the electronics within the panel. In this regard, a switch may monitor the access door for attempts by unauthorized persons to open this door. The tampering processor may monitor this switch for tampering.

Similarly, each sensor of the security system may have a continuity sensor that detects broken or cut wires. In the case where the system includes one or more wireless sensors, the control panel may include an interference detector that detects attempts to block signals from the wireless sensors.

Under one illustrated embodiment, the portable device is used for direct control of the security system via the control panel. The direct control is accomplished via a secure connection formed between the control panel and the portable device within the secured area using a process that prevents abuse.

Under the illustrated embodiment, the authenticity of the user and the portable device is ensured by proximity to the control panel during enrollment, by the user performing a physical action related to the control panel, and by entry of an appropriate PIN. In this regard, the physical action may include opening of the access door on the control panel using the key or by removal of the tamper-proof screws, thereby triggering a tampering signal and, potentially, a tamper alert.

Enrollment of the portable device with the control panel may occur under a Bluetooth format. In this regard, the authorized human user may enter his/her PIN and open the access door. This establishes the two prerequisites for enrollment of the portable device via an enrollment processor.

Once the two prerequisites are met, the user may activate the enrollment processor. The enrollment processor uses a wireless transceiver 44 of the control panel to pair with the portable device. Pairing, in this case means forming a secure control connection between the portable device and the control panel.

The control connection allows control of the security system via the portable device. Under one embodiment, corresponding pairs of feature processors operate to emulate the control features of the user interface through the portable device.

Through the control connection, the authorized user may arm and disarm the security system through the portable device. The user may also review any status messages from the user interface that are also displayed on the portable device. In addition, the user may review the status of individual sensors and/or zones. Sensors and/or zones may be disabled from the portable device in the same way as through the user interface.

Under the illustrated embodiment, control of the security system through the portable device is available so long as the portable device remains proximate to the control panel (e.g., less than 100 feet). As the portable device moves further away, the control connection is abandoned. When the portable device again becomes proximate the control panel (e.g., less than 30 feet), the control panel again establishes a control connection with the portable device.

In general, the system solves the problem of being able to easily use a Bluetooth device, such as a tablet or phone, to program a fire alarm, security, or other system while maintaining the security of the system by allowing an authorized user to log into the system directly through the user interface and enter a password. In general, the user would like to use a tablet or cell phone to program or access parts of the system that would otherwise require the user to be at the system panel and logged into the system with a secured password. The system recognizes the Bluetooth device (tablet or cell phone) belonging to an authorized user and allows the user to log into the system through the system's user interface. At that time, the user can use the tablet or cell phone to control the security system. This will maintain the security of the existing system and meet government agency listing requirements. If the Bluetooth device goes out of range, then the system logs the portable user out of the system.

Under illustrated embodiments, the user registers a paired Bluetooth device (tablet or cell phone) with the system, thereby providing the user with his/her own log in account on the system. Later, when the user approaches the system with his/her Bluetooth device, an icon will appear on the system's display alerting the user that the Bluetooth device is in range. When the icon displayed on the user interface is activated, a log in screen appears with the user's account name already populated. The user then enters his password through the portable device into the system's user interface. If the system accepts his/her password, then the Bluetooth device would be able to access the secure parts of the system.

In general, the system operates by executing a number of steps, including providing a control panel of a security system that protects a secured geographic area, the control panel having a user interface outside of the control panel and an access door secured by a lock, the access door being opened to provide access to an electronic controller of the security system for at least troubleshooting or control of the electronic controller, the electronic controller entering a set-up mode in response to detecting entry of a code by an authorized user through the user interface and opening of the access door, the electronic controller wirelessly pairing a portable device carried by the authorized user with the control panel and registering the portable device with the electronic controller while in the set-up mode, the electronic controller exiting the set-up mode and entering a normal operating mode, the electronic controller operating in the normal operating mode and detecting the portable device registered with the electronic controller, and the electronic controller automatically forming a wireless control connection between the portable device and the control panel, wherein the electronic controller enters a log-on mode during set-up in response to connecting to the portable device and allows the authorized user to unlock the access door and enter a password at the electronic controller, thereby enabling service and the control from the wireless device.

Alternatively, the system includes a control panel of a security system that protects a secured geographic area, the control panel having a user interface outside of the control panel and an access door secured by a lock, the access door being opened to provide access to an electronic controller of the security system for at least troubleshooting or control of wireless access to the electronic controller, and a processor of the electronic controller that enters a set-up mode in response to detecting entry of a code by an authorized user through the user interface and opening of the access door, wherein the processor wirelessly pairs a portable device carried by the authorized user with the control panel and registers the portable device with the electronic controller while in the set-up mode, wherein the processor exits the set-up mode and enters a normal operating mode, wherein the processor, in the normal operating mode, detects the portable device proximate the control panel and automatically forms a wireless control connection between the portable device and the control panel, and wherein the electronic controller enters a log-on mode in response to connecting to the portable device while the processor is in the set-up mode and allows the authorized user to unlock the access door and enter a password at the electronic controller, thereby enabling service and the control from the portable device.

Alternatively, the system includes a control panel of a security system that protects a secured geographic area, the control panel having a user interface outside of the control panel and an access door secured by a lock, the access door being opened to provide access to an electronic controller of the security system for at least troubleshooting or control of wireless access to the electronic controller, a set-up processor of the electronic controller that detects entry of a code by an authorized user through the user interface and opening of the access door, wherein the set-up processor wirelessly pairs a portable device carried by the authorized user with the control panel and registers the portable device with the electronic controller, and a second processor of the electronic controller that detects the portable device proximate the control panel and automatically forms a wireless control connection between the portable device and the control panel, the wireless control connection allowing the authorized user to remotely control the security system.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the FIGURES do not require the particular order shown or sequential order to achieve desirable results. Other steps may be provided, steps may be eliminated from the described flows, and other components may be added to or removed from the described embodiments.

The invention claimed is:

1. A method comprising:
providing a control panel of a security system that protects a secured geographic area, the control panel having a user interface outside of the control panel and an access door secured by a lock, the access door being opened to provide access to an electronic controller of the security system for at least troubleshooting or control of the electronic controller;
the electronic controller entering a set-up mode in response to detecting entry of a code by an authorized user through the user interface and opening of the access door;
the electronic controller wirelessly pairing a portable device carried by the authorized user with the control panel and registering the portable device with the electronic controller while in the set-up mode;
the electronic controller exiting the set-up mode and entering a normal operating mode;
the electronic controller operating in the normal operating mode and detecting the portable device registered with the electronic controller; and
the electronic controller automatically forming a wireless control connection between the portable device and the control panel, wherein the electronic controller enters a log-on mode during set-up in response to connecting to the portable device and allows the authorized user to unlock the access door and enter a password at the electronic controller, thereby enabling service and the control from the portable device.

2. The method as in claim 1 further comprising the electronic controller arming or disarming the security system based upon a respective instruction received from the authorized user of the security system through the wireless control connection from the portable device.

3. The method as in claim 1 further comprising the electronic controller sending an alarm message to the portable device through the wireless control connection.

4. The method as in claim 3 further comprising the electronic controller displaying a status of the security system on the portable device through the wireless control connection.

5. The method as in claim 4 further comprising the electronic controller detecting a threat within the secured geographic area.

6. The method as in claim 5 wherein the status displayed on the portable device includes an indicator of a type of the threat detected within the secured geographic area.

7. The method as in claim 6 wherein the status displayed on the portable device includes a location of the threat detected within the secured geographic area.

8. The method as in claim 1 further comprising the electronic controller disabling a zone of the security system based upon instructions received through the wireless control connection.

9. The method as in claim 5 further comprising a camera of the security system capturing an image of the threat.

10. The method as in claim 9 further comprising the electronic controller forwarding the image of the threat to the portable device.

11. An apparatus comprising:
a control panel of a security system that protects a secured geographic area, the control panel having a user interface outside of the control panel and an access door secured by a lock, the access door being opened to provide access to an electronic controller of the security system for at least troubleshooting or control of wireless access to the electronic controller; and
a processor of the electronic controller that enters a set-up mode in response to detecting entry of a code by an authorized user through the user interface and opening of the access door,
wherein the processor wirelessly pairs a portable device carried by the authorized user with the control panel and registers the portable device with the electronic controller while in the set-up mode,
wherein the processor exits the set-up mode and enters a normal operating mode,
wherein the processor, in the normal operating mode, detects the portable device proximate the control panel and automatically forms a wireless control connection between the portable device and the control panel, and
wherein the electronic controller enters a log-on mode in response to connecting to the portable device while the processor is in the set-up mode and allows the authorized user to unlock the access door and enter a password at the electronic controller, thereby enabling service and the control from the portable device.

12. The apparatus as in claim 11 wherein the processor arms or disarms the security system based upon a respective instruction received from the authorized user of the security system through the wireless control connection from the portable device.

13. The apparatus as in claim 11 wherein the processor sends an alarm message to the portable device through the wireless control connection.

14. The apparatus as in claim 13 wherein the processor sends a status of the security system to the portable device through the wireless control connection.

15. The apparatus as in claim 14 wherein the processor detects a threat within the secured geographic area.

16. The apparatus as in claim 15 wherein the status includes an indicator of a type of the threat detected within the secured geographic area.

17. The apparatus as in claim 16 wherein the status includes a location of the threat detected within the secured geographic area.

18. The apparatus as in claim 11 wherein the processor disables a zone of the security system based upon instructions received through the wireless control connection.

19. The apparatus as in claim 15 further comprising a camera of the security system that captures an image of the threat, wherein the processor forwards the image of the threat to the portable device.

20. An apparatus comprising:
a control panel of a security system that protects a secured geographic area, the control panel having a user interface outside of the control panel and an access door secured by a lock, the access door being opened to provide access to an electronic controller of the security system for at least troubleshooting or control of wireless access to the electronic controller;

a set-up processor of the electronic controller that detects entry of a code by an authorized user through the user interface and opening of the access door, wherein the set-up processor wirelessly pairs a portable device carried by the authorized user with the control panel and registers the portable device with the electronic controller; and a second processor of the electronic controller that detects the portable device proximate the control panel and automatically forms a wireless control connection between the portable device and the control panel, the wireless control connection allowing the authorized user to remotely control the security system.

* * * * *